US012641087B2

(12) United States Patent
Jobse

(10) Patent No.: US 12,641,087 B2
(45) Date of Patent: May 26, 2026

(54) DATA PROTECTION WITH ONLINE ACCOUNT VALIDATION

(71) Applicant: Microsoft Technology Licensing, LLC, Redmond, WA (US)

(72) Inventor: Ryan Lee Jobse, Leesburg, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 18/279,575

(22) PCT Filed: Feb. 28, 2022

(86) PCT No.: PCT/US2022/018099
§ 371 (c)(1),
(2) Date: Aug. 30, 2023

(87) PCT Pub. No.: WO2022/216382
PCT Pub. Date: Oct. 13, 2022

(65) Prior Publication Data
US 2024/0171584 A1 May 23, 2024

(30) Foreign Application Priority Data
Apr. 8, 2021 (LU) ........................................ 102763

(51) Int. Cl.
*H04L 9/40* (2022.01)
(52) U.S. Cl.
CPC .......... *H04L 63/102* (2013.01); *H04L 63/107* (2013.01)
(58) Field of Classification Search
CPC ............................ H04L 63/102; H04L 63/107
See application file for complete search history.

(56) References Cited

U.S. PATENT DOCUMENTS

| | | | |
|---|---|---|---|
| 8,468,586 B2 | 6/2013 | Koottayi et al. | |
| 8,762,642 B2 | 6/2014 | Bates et al. | |
| 9,253,254 B2 | 2/2016 | Nowack et al. | |
| 9,781,122 B1 | 10/2017 | Wilson et al. | |

(Continued)

FOREIGN PATENT DOCUMENTS

EP 1633083 A1 3/2006

OTHER PUBLICATIONS

"Create Partner Accounts", Retrieved from: https://help.salesforce.com/s/articleView?id=sf.networks_partner_community_create_account.htm&type=5, Retrieved Date: Jan. 7, 2020, pp. 1-3.

(Continued)

*Primary Examiner* — Harris C Wang
(74) *Attorney, Agent, or Firm* — Schwegman Lundberg & Woessner, P.A.

(57) ABSTRACT

Methods, systems, and computer programs are presented for validating accounts in an online service. One method includes an operation for determining if accounts in an online service are valid and compliant, which includes checking one or more compliance conditions defined for the account. Further, the method includes operations for storing, in a cache memory, information for the accounts that are determined to be valid and compliant, and for receiving a request for information for one or more of the accounts. The method further includes operations for accessing the cache memory to obtain information for the at least one account, the information comprising an indication if the account is valid and compliant. Access to the information is blocked for the accounts associated with the request that are not valid and compliant. The method includes returning, for the accounts that are valid and compliant, the obtained information in response to the request.

19 Claims, 8 Drawing Sheets

(56)    References Cited

U.S. PATENT DOCUMENTS

| | | | |
|---|---|---|---|
| 10,949,406 B1 * | 3/2021 | Calvo | G06F 16/215 |
| 2003/0046550 A1 | 3/2003 | Carroll et al. | |
| 2011/0307957 A1 * | 12/2011 | Barcelo | G06Q 10/0635 |
| | | | 726/25 |
| 2013/0061219 A1 * | 3/2013 | Jerbi | G06F 21/577 |
| | | | 718/1 |
| 2013/0312057 A1 * | 11/2013 | Dabbiere | G06F 21/6218 |
| | | | 726/1 |
| 2015/0227728 A1 | 8/2015 | Grigg et al. | |
| 2017/0295199 A1 | 10/2017 | Kirti et al. | |
| 2019/0081953 A1 * | 3/2019 | Bai | H04W 12/069 |
| 2020/0133640 A1 * | 4/2020 | Thiru | G06F 8/22 |
| 2020/0133955 A1 | 4/2020 | Padmanabhan et al. | |
| 2020/0242612 A1 * | 7/2020 | Clow, II | G06Q 10/0631 |
| 2021/0306320 A1 * | 9/2021 | Squire | G06F 21/6245 |
| 2025/0080469 A1 * | 3/2025 | Smith | H04L 47/2441 |

OTHER PUBLICATIONS

"Search Report and Written Opinion Issued in Luxembourg Patent Application No. LU102763", Mailed Date: Dec. 13, 2021, 9 Pages.

"International Search Report and Written Opinion Issued in PCT Application No. PCT/US22/018099", Mailed Date: May 27, 2022, 13 Pages.

Vala, et al., "Security Requirements for using Partner Center or Partner Center APIs", Retrieved from: https://web.archive.org/web/20221215144859/https://learn.microsoft.com/en-us/partner-center/partner-security-requirements, Oct. 25, 2022, pp. 1-9.

Communication under Rule 71(3) Received in European Patent Application No. 22709523.9, mailed on Jun. 17, 2025, 06 pages.

Decision to grant a European patent pursuant to Article 97(1) EPC, Received in European Patent Application No. 22709523.9, mailed on Oct. 9, 2025, 02 pages.

* cited by examiner

ACCOUNT REGISTRATION SERVICE READ FLOW

PERIODICALLY CHECK ACCOUNTS

REQUEST FOR ACCOUNT INFORMATION

DATA PROTECTION WITH ONLINE ACCOUNT VALIDATION

CLAIM OF PRIORITY

This application is a U.S. National Stage Filing under 35 U.S.C. 371 of International Patent Application Serial No. PCT/US2022/018099, filed Feb. 28, 2022, and published as WO 2022/216382 A1 on Oct. 13, 2022, which claims the benefit of priority to Luxembourg Patent Application No. LU102763, filed Apr. 8, 2021, which applications are incorporated herein by reference in their entirety.

TECHNICAL FIELD

The subject matter disclosed herein generally relates to methods, systems, and machine-readable storage media for protecting access to online accounts.

BACKGROUND

Security is an important consideration for multi-tenant cloud services deployment. Since multiple users operate in the same cloud service, the users must be separated, such that a user cannot access data from other users. The security measures enacted by the cloud service provider stop users from unauthorized access. However, due to misconfiguration of an account, a software bug, or some other factor, a malicious user may be able to access the data from another user.

Further, the accounts implemented on the cloud service must meet compliance requirements depending on business need, such as guarantying that the data resides in the same country where the business operate.

What is needed is security that guarantees that the programs and data from a user are not accessible to any unauthorized user, and that the access to the data is compliant to guarantee business requirements, such as data privacy.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to validating accounts in an online service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To protect account access, service providers usually perform security measures on write operations, e.g., when the data is written to the cloud service, which may include unit tests, manual approvals, etc. This way, misconfigured accounts (including malicious accounts) are prevented from being checked in. However, if a misconfigured account bypasses the write checks (e.g., a manual check did not catch an error, someone manually uploaded a malicious account), then the misconfigured account may be able to perform any type of read operation and access data from other accounts.

In one aspect, account registration logic guards against all read operations of the online service accounts, that is, the accounts are validated before being accessed, and only valid and compliant accounts can be used to read the data. By having registration logic that is executed whenever a read operation is performed, all misconfigured or noncompliant accounts are automatically blocked and will not be able to read any data.

One general aspect includes a method that includes an operation for determining if a plurality of accounts in an online service are valid and compliant. Determining if an account is compliant includes checking one or more compliance conditions defined for the account, a compliance condition being a rule that must be satisfied for access to be enabled in the account. Further, the method includes operations for storing, in a cache memory, information for the accounts that are determined to be valid and compliant, and for receiving a request for information for one or more of the accounts from the plurality of accounts. The method further includes operations for accessing, based on the request, the cache memory to obtain information for the at least one account, the information comprising an indication if the account is valid and compliant. The method further includes blocking access to information for the accounts associated with the request that are not valid and compliant. Further, the method includes returning, for the accounts associated with the request that are valid and compliant, the obtained information in response to the request.

Figure 1:
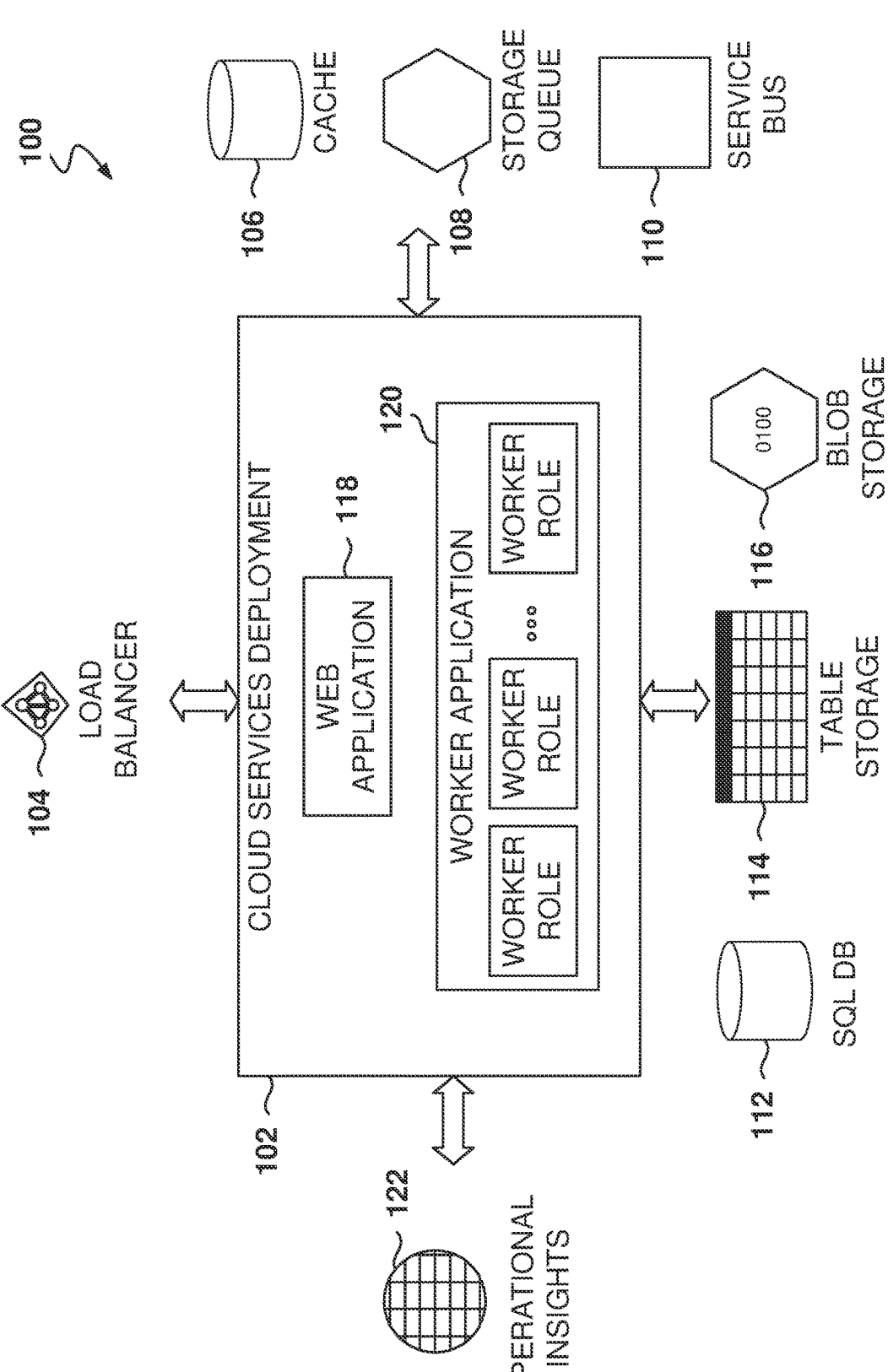
FIG. 1 is a diagram of a sample architecture for deploying cloud services.

FIG. 1 is a sample architecture 100 for deploying cloud services. Cloud Services deployment 102 involves deploying applications as virtual machines (VMs). The code is executed as VM instances, such as a web application 118 or a worker role. To deploy a workload in the cloud Service is to deploy one or more VM instances that run the workload. A workload refers to executable program instructions to perform a specific task or provide a service.

Further, an application can be thought of as a set of web or worker role instances within the cloud service deployment. In the illustrated example, a worker application 120 includes a set of worker role instances.

The architecture of a Cloud Services application usually includes numerous external service dependencies, such as, in the case of Microsoft Azure Services, a Service Bus 110, Azure Table storage 114, blob storage 116, SQL Database 112, etc., to manage the state and data of an application and communication between web application 118 and worker roles in the cloud services deployment 102. Further, a cache 106 is used for caching data and a storage queue 108 may be used as a communication mechanism between processes. The storage queue 108 that durably stores work tasks from one process to another.

Further, a load balancer 104 may be used to balance the loads for the web applications 118 and the worker applications 120 across multiple servers in a distributed environment. Further, operational insights 122 are provided to users showing the performance of their processes and the service.

Figure 2:
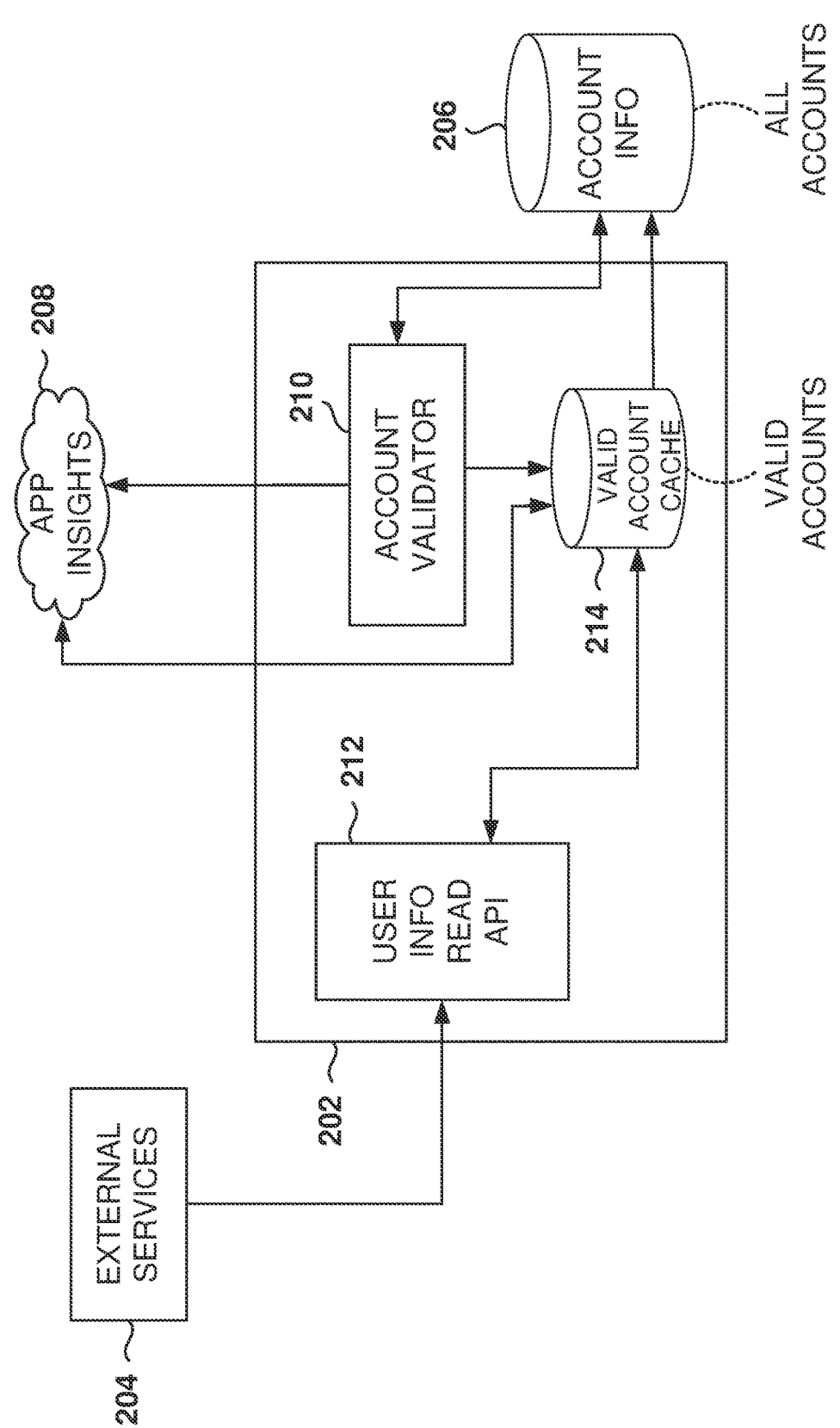
FIG. 2 is a diagram illustrating the account-registration-service read flow, according to some example embodiments.

FIG. 2 illustrates the account-registration-service read flow, according to some example embodiments. A service cluster 202 of the cloud service provides account validation services. Further, an account information database 206 includes the information for the registered accounts.

Account information includes a list of resources (e.g., Azure resources) associated with the account, such as storage, computer clusters, key vaults for keeping encryption keys, etc. This account information is kept in a configuration file in the account information database 206. When a new account is created, these resources are allocated and the configuration for the account created. Typically, the account is checked for validity and compliance when created, such as by performing some automated tests or by having an administrator checking manually. In an example, an account is valid when the account exists in the system and users are enabled to access the system using this account. Further, an account is compliant when it meets the requirements configured for the account in order to be used by a user. For example, an account may be valid but a security requirement is not being met at a given time; in this case, the account is valid but non-compliant. Solving the security requirement will make the account compliant and available for use.

However, if a mistake is made during the initial validation, the system may be exposed to future attacks by a malicious user using the misconfigured account. In some example embodiments, the validity of the account is checked when the account is accessed, not just when it's created. This way, an invalid or misconfigured account will be stopped from being used for inappropriate access.

Further, an account may be valid when created, but changing circumstances may make the account invalid or noncompliant with requirements for the account. If the account is checked only when created, then this type of account would create a vulnerability. By performing checks on the access to the account, it is possible to detect these accounts that have become non-valid and stopped access for them.

The account validator 210 reads the account information from the account information database 206 and validates each of the accounts. In some example embodiments, the account validator 210 performance the validation periodically, but in other embodiments, the account validator may also perform the validations on the main, for all the accounts, or for a subset of the accounts. More details about the account validation and compliance are provided below with reference to FIG. 3.

The accounts that are valid are saved in the valid-account cache database 214, that is, the valid-account cache database 214 stores the account that are validated and does not store the accounts that are not valid.

A user information read Application Programming Interface (API) 212 in the service cluster 202, provides a read service for getting valid account information. When external services 204 need to validate if an account is valid, or getting a list of all the valid accounts, the external services 204 make a request through the user information read API 212, which will return a complete list of valid accounts (retrieved from the valid-account cache database 214) or a subset thereof. That is, the request to the API may be for a defined set of accounts or for all the accounts. The user information read API 212 will not return invalid accounts, so the read operation for an invalid account will not succeed.

One example of external services 204 is a garbage-collection process that is run periodically to delete obsolete information. The garbage-collection process requests the list of invalid accounts through the user information read API 212, and once all the valid accounts are returned, they garbage-collection process will perform garbage collection in each of the individual valid accounts. Other external service is a job orchestrator that create and manage jobs to be performed by the cloud service. The job orchestrator uses the account information to make sure that the jobs are appropriately created. For example, a request is received to perform a requested job when a certain account. The job orchestrator will validate that the account is valid in the requested job is authorized.

Application insights 208 is in communication with service cluster 202 to collect statistical information about the validated accounts and is in communication with the valid-account cache database 214. The statistical information may be presented on a user interface.

By using the account validator 210, only the valid accounts are presented, so invalid accounts cannot be used to perform any read operation or execute a job.

Further, another benefit of having a well-defined structure for validating accounts on-the-fly is that the system is more agile. For example, when creating an account, the administrator is not worried if an invalid account "falls through the cracks" and is enabled, because the administrator knows that the invalid or non-compliant account will be blocked for execution of read operations for executing jobs.

Figure 3:
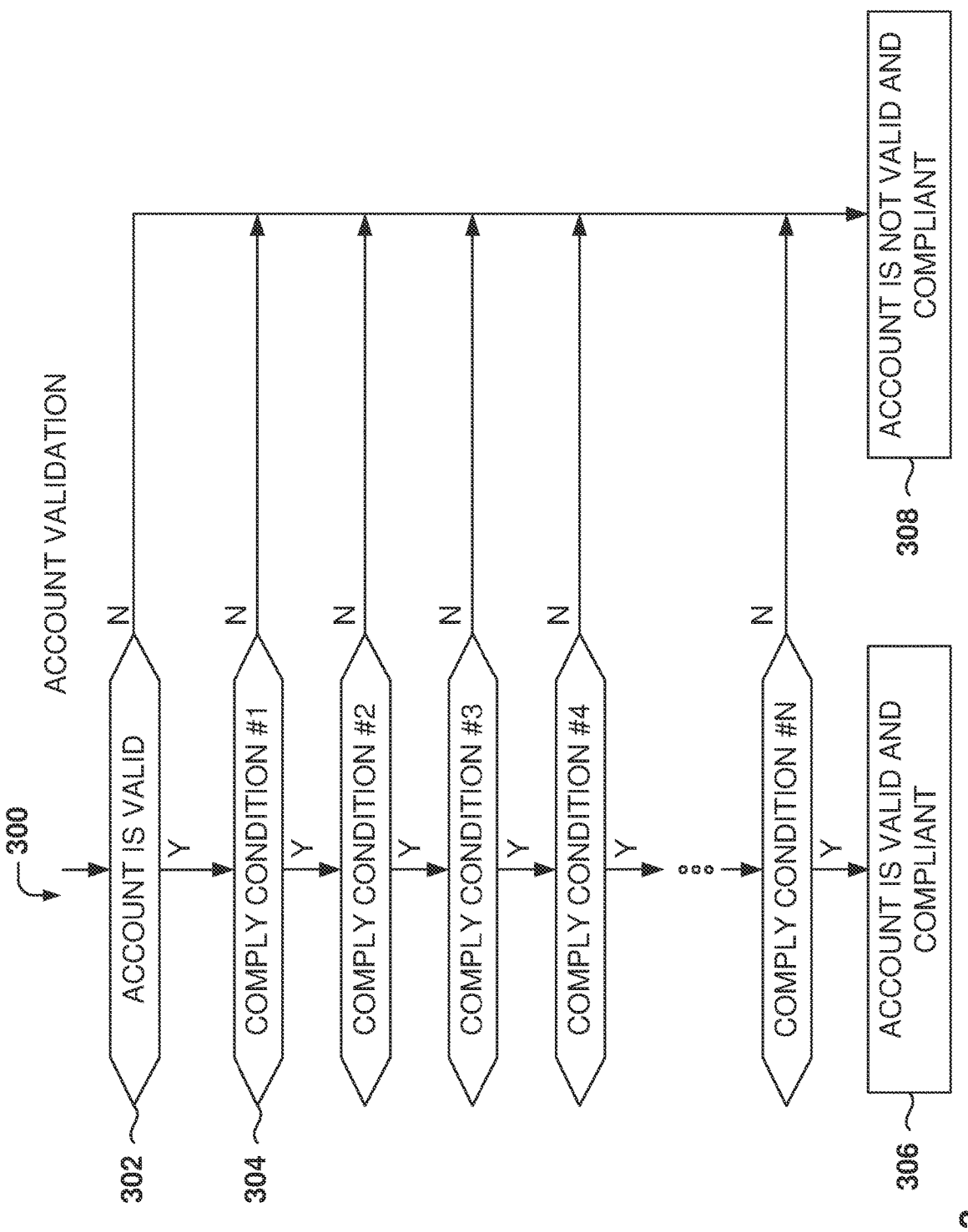
FIG. 3 is a flowchart of a method for validating an account, according to some example embodiments.

FIG. 3 is a flowchart of a method 300 for validating an account, according to some example embodiments. While the various operations in this flowchart are presented and described sequentially, one of ordinary skill will appreciate that some or all of the operations may be executed in a different order, be combined or omitted, or be executed in parallel.

At operation 302, a check is made to determine if the account is valid, which means checking whether the account is properly configured within the system, has been properly created, is active, etc. If the account is not valid, the method 300 flows to operation 308, and if the account is valid, the method 300 flows to operation 304.

Compliance may include one or more compliance conditions, and checking for compliance starts at operation 304 to check for compliance condition #1. A compliance condition is a rule that must be satisfied by an account to meet a requirement for the account, that is, the account is compliant with respect to this requirement.

If the account is compliant, the method 300 flows to check the next compliance condition, and then the process repeats until all the compliance conditions are satisfied or the account is found nonvalid or noncompliant (operation 308). If all the compliance conditions are satisfied, at operation 306, the account is determined to be valid and compliant.

One compliance condition refers to geographic boundaries for the account, such that the account must have the data stored in a defined geographical area (e.g., a country) or that the jobs must be executed in servers at the geographical area (e.g., to avoid that the data is transferred to another geographical area for executing the job).

Another compliance condition refers to the resources that are available to the account. For example, an employee of the service provider may have access to some accounts for system maintenance, but the employee may not have access to other accounts, and servicing these accounts may require authorization. For example, the employee may be given access for an hour to perform a job, and the access will automatically be revoked after the hour has elapsed.

Another compliance example is that the user of the account may have certain credentials, e.g., the user has been certified with reference to some skill (e.g., cloud service maintenance).

Checking that the user has the appropriate resources (e.g., Azure resources) provide a new level of security. For example, checking that the account is in the appropriate subscription, which is a collection of resources in the cloud service. The compliance checks determine that a given collection of Azure resources are all compliant and can be accessed by the user.

Figure 4:
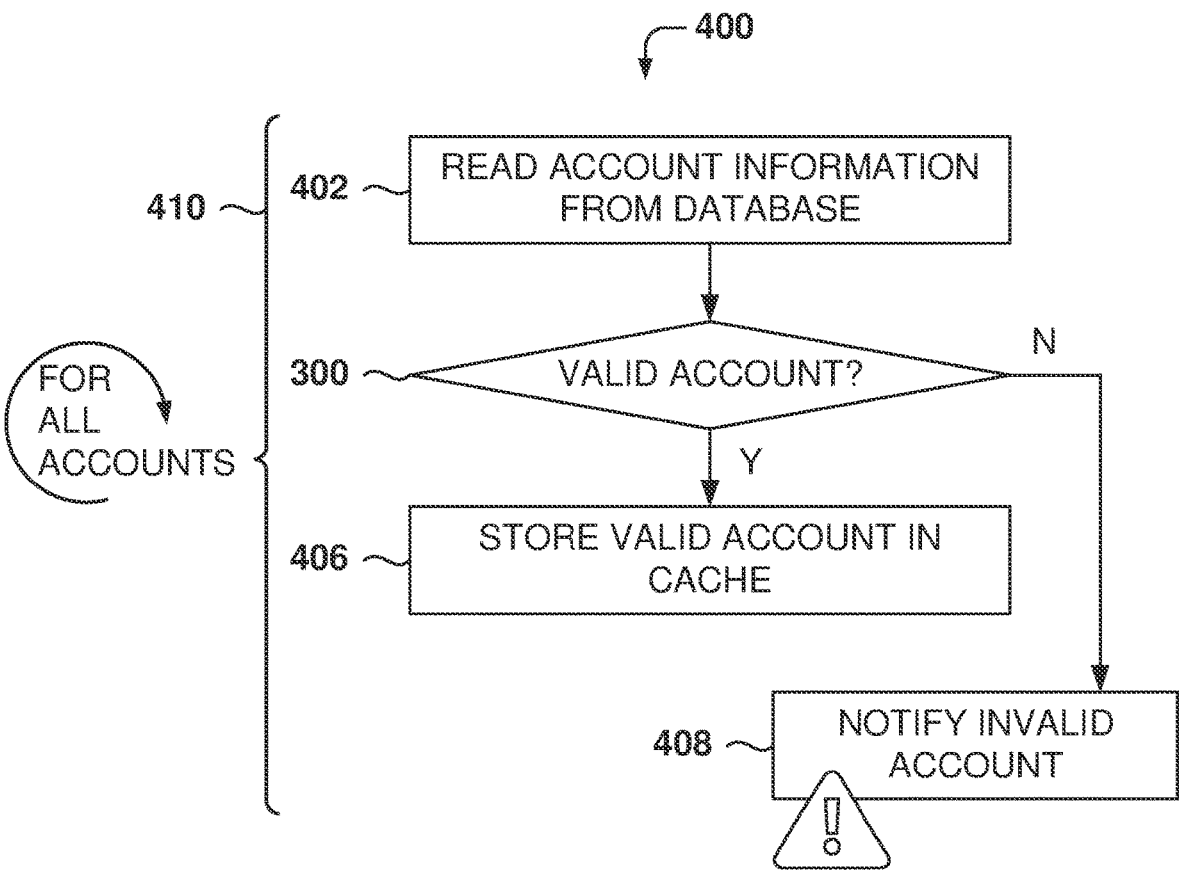
FIG. 4 is a flowchart of a method for periodically checking the validity of accounts in the online service, according to some example embodiments.

FIG. 4 is a flowchart of a method 400 for periodically checking the validity of accounts in the online service, according to some example embodiments. In some example embodiments, the account validator 210, shown in FIG. 2, performs the checking for the invalid accounts.

The check 410 is performed for all the configured accounts. At operation 402, the account information is read from the database (e.g., account information database 206).

From operation 402, the method 400 flows to method 300 to check if the account is valid, as illustrated above with reference to FIG. 3.

If the account is valid, the method 400 flows to operation 406, and if the account is invalid, the method 400 flows to operation 408, where a notification is created that the account is invalid (e.g., a long entry is created, a message is sent to a system administrator).

At operation 406, the information for the invalid account is stored in a memory (e.g., valid-account cache database 214 in FIG. 2).

It is noted that, the method 400 is for checking validity for all the accounts. In other example embodiments, the validity check may be performed for a subset of all the accounts, such as for one account or a set of accounts.

The technical advantage of checking accounts before the accounts are accessed is that the cloud online service is able to guard against invalid accounts that might have bypassed all write checks and still made it into the storage account. Guarding against read operations prevents invalid accounts from being read by the platform even if it is in the user database store.

Another technical advantage of this approach is that the validation checks are made in the same environment as the workspaces themselves. For compliance reasons, production workspaces may be created using a production certificate and, as a result, developers do not have access to this certificate and cannot access the accounts. This prevents developers from being able to write tests that access unauthorized data.

An example of a test that can be performed on an account is to try to access an arbitrary data-storage path in the account, which will fail if the account is invalid or non-compliant. Because the production certificate is needed to perform the access, this test could not be performed for write checks but can be performed with the read checks. Other possible checks include reading what subscription is storing the workspaces to make sure the workspaces reside in a compliant subscription before allowing the platform to execute them.

Checking for valid and compliant accounts is more than just simply checking a login identifier and a password of a user, because the validity and compliance checks are for the account itself to determine if the account is accessible at all by any user. For example, a user may have the correct login and password for one account, but the user will not be able to access the account if the account is not valid and compliant. The difference is that checking login and password is a check about the user capability to access the account, while checking validity and compliance are checks made on the account itself, not the users of the account.

In some example embodiments, the account may be assigned a type of account and a set of compliance rules may be provided for this type of accounts. For example, if an account is stacked as a healthcare account, associated compliance conditions for healthcare will automatically be imposed, e.g., protecting user privacy, access to data, regulations compliance, etc.

Another type of compliance check is checking if the role of the user that wants to access the data is valid for accessing the data. For example, a user may be a resource owner or an administrative owner. Every resource has a specific owner assigned to them. Checks may be provided to check for the user role. For example, the administrator is able to provision resources within one of these subscriptions, but other user roles cannot.

Figure 5:
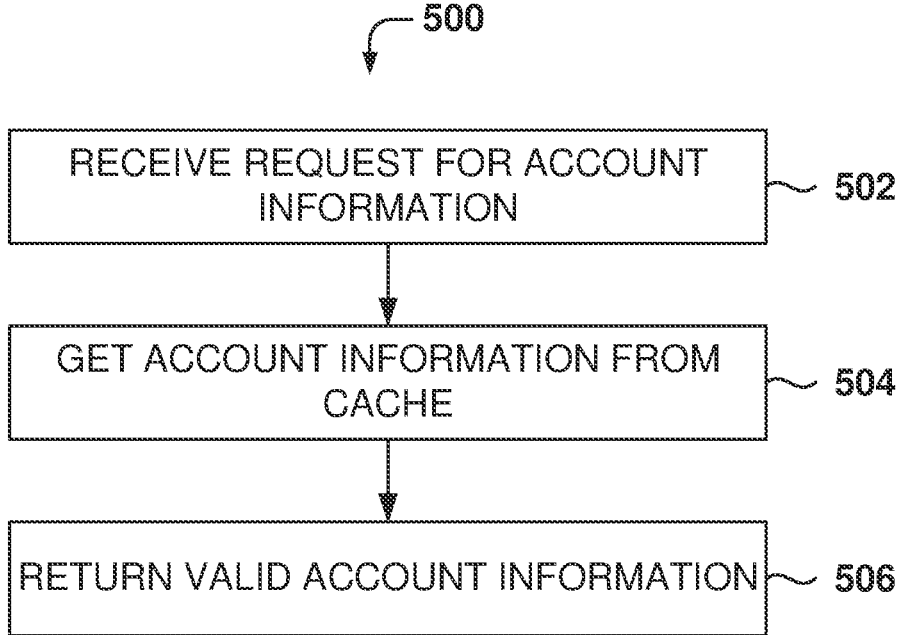
FIG. 5 is a flowchart of a method for requesting account information, including whether the account is valid, according to some example embodiments.

FIG. 5 is a flowchart of a method 500 for requesting account information, including whether the account is valid, according to some example embodiments. In some example embodiments, the operations of the method 500 are performed by the service cluster 202 of FIG. 2.

At operation 502, a request is received for account information. The request may be for getting information about all the available accounts, for a subset of accounts, or for a single account.

From operation 502, the method 500 flows to operation 504 where the account information is retrieved from the cache (e.g., valid-account cache database 214 of FIG. 2).

At operation 506, the valid account information is returned. That is, only the account or accounts that are valid are returned. If no valid account is found based on the request, the return information will not include information for any account.

Figure 6:
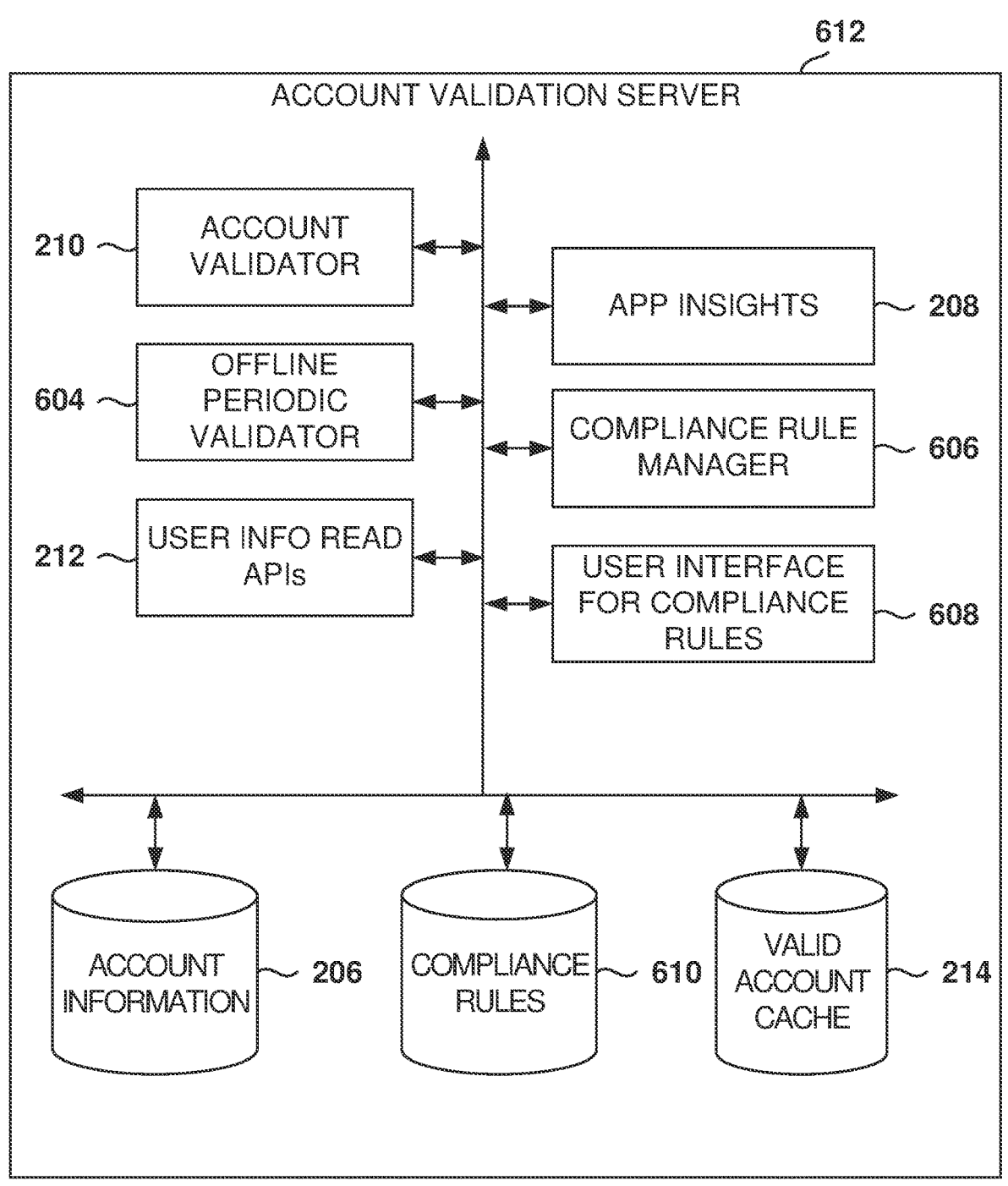
FIG. 6 is a block diagram illustrating an account validation server for implementing example embodiments.

FIG. 6 illustrates an account validation server for implementing example embodiments. The account validation server 612 includes resources for validating accounts. In some example embodiments, the account validation server 612 includes the account validator 210, and offline periodic validator 604, the user information read API 212, the application insights 208, a compliance rule manager 606, a user interface for compliance rules 608, the account information database 206, a compliance rules database 610, and the valid-account cache database 214.

The offline periodic validator 604 periodically validates all the accounts from the account information database 206 and stores the valid accounts in the valid-account cache database 214. The compliance rule manager 606 coordinate activities for managing compliance rules, which are stored in the compliance rules database 610, such as by adding compliance rules, modifying compliance rules, or deleting compliance rules. Further, the user interface for compliance rules 608 is provided to enable an administrator to configure the compliance rules for one or more accounts.

Figure 7:
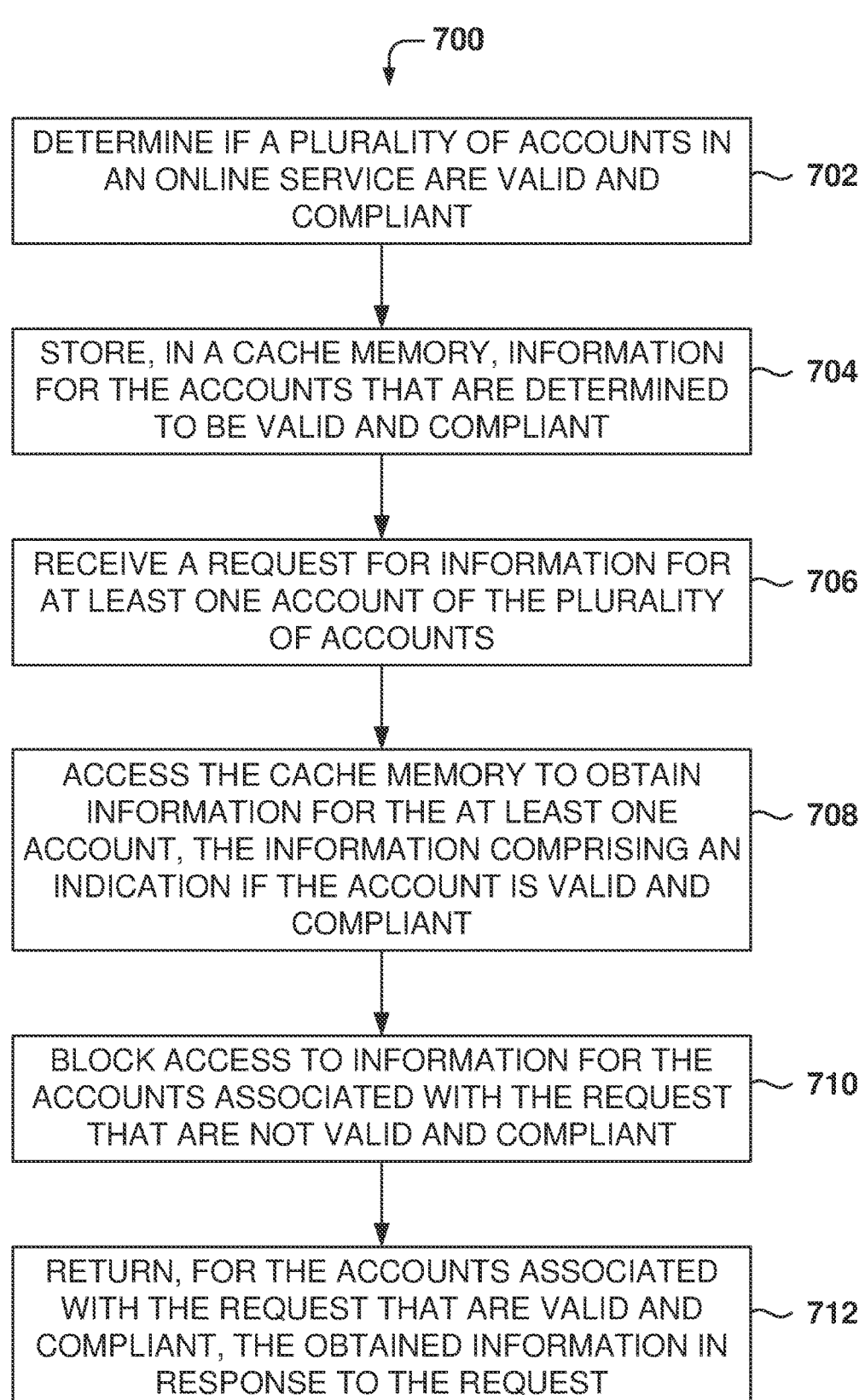
FIG. 7 is a flowchart of a method for validating accounts in an online service, according to some example embodiments.

FIG. 7 is a flowchart of a method 700 for validating accounts in an online service, according to some example embodiments. While the various operations in this flowchart are presented and described sequentially, one of ordinary skill will appreciate that some or all of the operations may be executed in a different order, be combined or omitted, or be executed in parallel.

Operation 702 is for determining if a plurality of accounts in an online service are valid and compliant. Determining if an account is compliant includes checking one or more compliance conditions defined for the account, a compliance condition being a rule that must be satisfied for access to be enabled in the account.

From operation 702, the method 700 flows to operation 704 for storing, in a cache memory, information for the accounts that are determined to be valid and compliant.

From operation 704, the method 700 flows to operation 706 for receiving a request for information for one or more of the accounts from the plurality of accounts.

From operation 706, the method flows to operation 708 for accessing, based on the request, the cache memory to obtain information for the at least one account, the information comprising an indication if the account is valid and compliant.

Further, from operation 708, method flows to operation 710 for blocking access to information for the accounts associated with the request that are not valid and compliant.

From operation 710, the method flows to operation 712 for returning, for the accounts associated with the request that are valid and compliant, the obtained information in response to the request.

In one example, a first compliance condition includes that data for the account is stored in a predefined geographical area.

In one example, a second compliance condition includes checking that the account is in an appropriate subscription, for the online service, the subscription being a collection of resources in the online service.

In one example, a third compliance condition includes checking that resources available in the account are authorized for use by a user.

In one example, wherein the account is compliant when all the compliance conditions are met, and the account is not compliant when at least one compliance condition is not met.

In one example, the method 700 further includes providing a user interface for adding, deleting, and changing compliance rules used for checking compliance.

In one example, the method 700 further includes generating a notification for accounts that are not determined to be valid and compliant.

In one example, determining if the plurality of accounts in an online service are valid and compliant is performed periodically.

In one example, the method 700 further includes enabling a read operation for one account when the account is valid and compliant.

In one example, a user with an authorized login and password will not be enabled to access the account when the account is not valid and the user will not be enabled to access the account when the account is not compliant.

In one example, receiving a request for information for the plurality of accounts includes receiving the request via an Application Programming Interface (API).

In one example, the API provides options for: retrieving information for the plurality of accounts, retrieving information for one account of the plurality of accounts, and retrieving information for a subset of accounts from the plurality of accounts.

In one example, the method 700 further includes performing statistical analysis of a state of the valid accounts, and presenting results of the statistical analysis.

Another general aspect is for a system that includes a memory comprising instructions and one or more computer processors. The instructions, when executed by the one or more computer processors, cause the one or more computer processors to perform operations comprising: determining if a plurality of accounts in an online service are valid and compliant, wherein determining if an account is compliant includes checking one or more compliance conditions defined for the account, a compliance condition being a rule that must be satisfied for access to be enabled in the account; storing, in a cache memory, information for the accounts that are determined to be valid and compliant; receiving a request for information for at least one account of the plurality of accounts; accessing, based on the request, the cache memory to obtain information for the at least one account, the information comprising an indication if the account is valid and compliant; blocking access to information for the accounts associated with the request that are not valid and compliant; and returning, for the accounts associated with the request that are valid and compliant, the obtained information in response to the request.

In yet another general aspect, a machine-readable storage medium (e.g., a non-transitory storage medium) includes instructions that, when executed by a machine, cause the machine to perform operations comprising: determining if a plurality of accounts in an online service are valid and compliant, wherein determining if an account is compliant includes checking one or more compliance conditions defined for the account, a compliance condition being a rule that must be satisfied for access to be enabled in the account; storing, in a cache memory, information for the accounts that are determined to be valid and compliant; receiving a request for information for at least one account of the plurality of accounts; accessing, based on the request, the cache memory to obtain information for the at least one account, the information comprising an indication if the account is valid and compliant; blocking access to information for the accounts associated with the request that are not valid and compliant; and returning, for the accounts associated with the request that are valid and compliant, the obtained information in response to the request.

Figure 8:
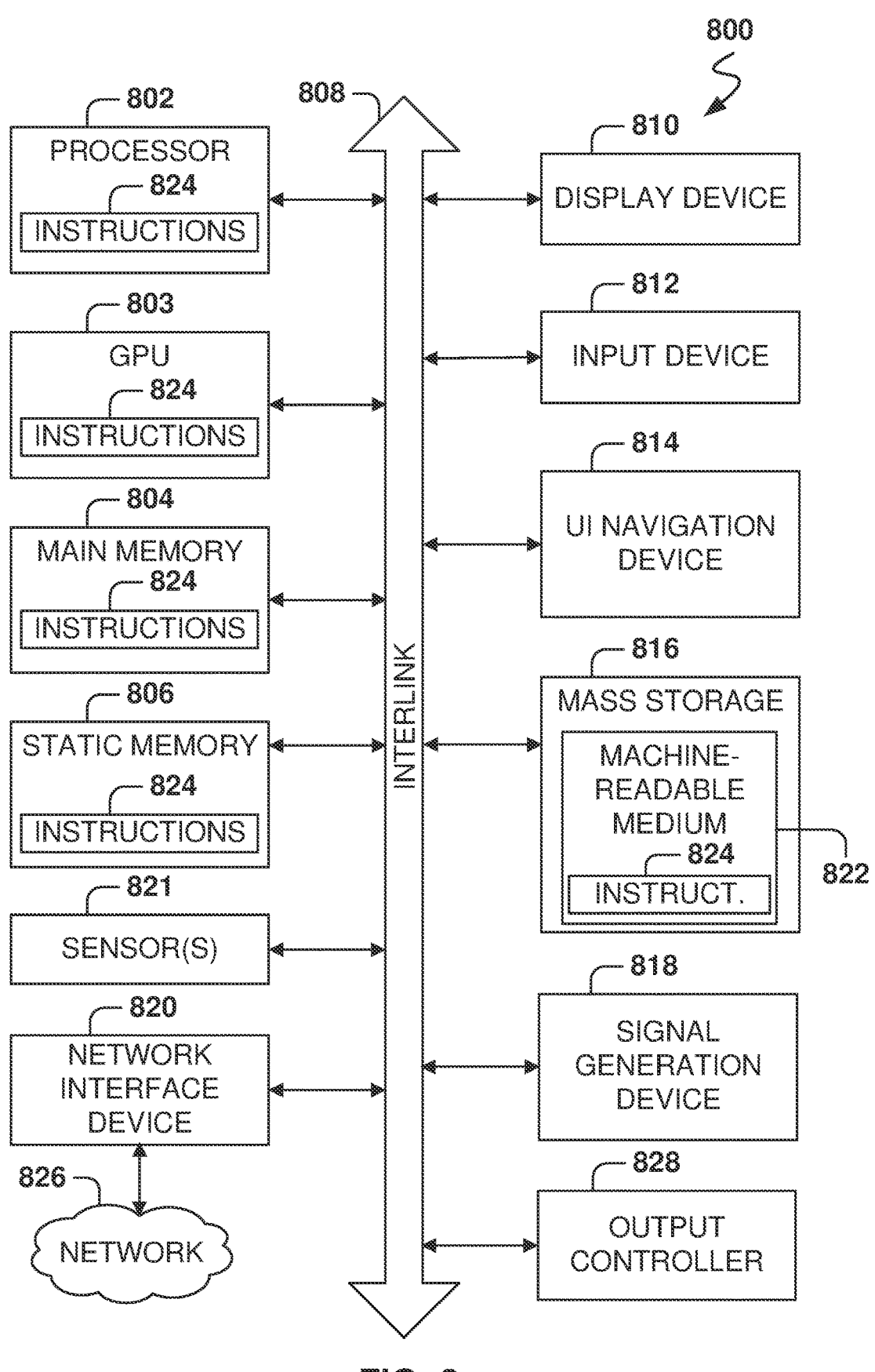
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
determining if a plurality of accounts in an online service are valid by verifying whether the plurality of accounts are active and whether users are enabled to access the accounts;
determining if the plurality of accounts are compliant by checking one or more compliance conditions defined for the account, a compliance condition being a rule that must be satisfied for access to be enabled in the account;
storing, during a periodic validation and in a valid-account cache memory, information for only the accounts that are determined to be valid and compliant;
receiving, via an application programming interface (API), a request for information for at least one account of the plurality of accounts from the valid-account cache memory;
accessing, based on the request, the valid-account cache memory to obtain the information for the at least one account, the information comprising an indication if the account is valid and compliant stored during the periodic validation;
blocking access to at least one resource for the accounts associated with the request that are not both valid and compliant; and
permitting access, for the accounts associated with the request that are valid and compliant, to the at least one resource in response to the request.

2. The method as recited in claim 1, wherein a first compliance condition includes that data for the account is stored in a predefined geographical area.

3. The method as recited in claim 1, wherein a second compliance condition includes checking that the account is in an appropriate subscription, for the online service, the subscription being a collection of resources in the online service.

4. The method as recited in claim 1, wherein a third compliance condition includes checking that resources available in the account are authorized for use by a user.

5. The method as recited in claim 1, wherein the account is compliant when all the compliance conditions are met and the account is not compliant when at least one compliance condition is not met.

6. The method as recited in claim 1, further comprising:
providing a user interface for adding, deleting, and changing compliance rules used for checking compliance.

7. The method as recited in claim 1, further comprising:
generating a notification for accounts that are not determined to be valid and compliant.

8. The method as recited in claim 1, wherein the determining if the plurality of accounts in an online service are valid and compliant is performed periodically.

9. The method as recited in claim 1, further comprising:
enabling a read operation for one account when the account is valid and compliant.

10. The method as recited in claim 1, wherein a user with an authorized login and password will not be enabled to access the account when the account is not valid and the user will not be enabled to access the account when the account is not compliant.

11. The method as recited in claim 1, wherein the API provides options for:
retrieving information for the plurality of accounts, retrieving information for one account of the plurality of accounts, and retrieving information for a subset of accounts from the plurality of accounts.

12. The method as recited in claim 1, further comprising:
performing statistical analysis of a state of the valid accounts; and
presenting results of the statistical analysis.

13. A system comprising
a memory including instructions stored thereon;
processing circuitry coupled to the memory, the processing circuitry configured to execute the instructions, the instructions, when executed cause the processing circuitry to perform operations comprising:
determining if a plurality of accounts in an online service are valid by verifying whether the plurality of accounts are active and whether users are enabled to access the accounts;
determining if the plurality of accounts are compliant by checking one or more compliance conditions defined for the account, a compliance condition being a rule that must be satisfied for access to be enabled in the account;
storing, during a periodic validation and in a valid-account cache memory, information for only the accounts that are determined to be valid and compliant;
receiving, via an application programming interface (API), a request for information for at least one account of the plurality of accounts from the valid-account cache memory;
accessing, based on the request, the valid-account cache memory to obtain the information for the at least one account, the information comprising an indication if the account is valid and compliant stored during the periodic validation;
blocking access to information for the accounts associated with the request that are not both valid and compliant; and
returning, for the accounts associated with the request that are valid and compliant, the obtained information in response to the request.

14. At least one non-transitory machine-readable media including instructions that, when executed by a machine, cause the machine to perform operations comprising:
determining if a plurality of accounts in an online service are valid by verifying whether the plurality of accounts are active and whether users are enabled to access the accounts;
determining if the plurality of accounts are compliant by checking one or more compliance conditions defined for the account, a compliance condition being a rule that must be satisfied for access to be enabled in the account;
storing, during a periodic validation and in a valid-account cache memory, information for only the accounts that are determined to be valid and compliant;
receiving, via an application programming interface (API), a request for information for at least one account of the plurality of accounts from the valid-account cache memory;
accessing, based on the request, the valid-account cache memory to obtain the information for the at least one account, the information comprising an indication if the account is valid and compliant stored during the periodic validation;

blocking access to information for the accounts associated with the request that are not both valid and compliant; and returning, for the accounts associated with the request that are valid and compliant, the obtained information in response to the request.

15. The at least one non-transitory machine-readable media as recited in claim 14, wherein a first compliance condition includes that data for the account is stored in a predefined geographical area.

16. The at least one non-transitory machine-readable media as recited in claim 14, wherein a second compliance condition includes checking that the account is in an appropriate subscription, for the online service, the subscription being a collection of resources in the online service.

17. The at least one non-transitory machine-readable media as recited in claim 14, wherein a third compliance condition includes checking that resources available in the account are authorized for use by a user.

18. The at least one non-transitory machine-readable media as recited in claim 14, wherein the operations further comprise associating compliance conditions with the accounts based on a type of the account.

19. The at least one non-transitory machine-readable media as recited in claim 14, wherein determining if a plurality of accounts in an online service are valid includes performing at least one validation check on the plurality of accounts including trying to access an arbitrary resource of the account which fails if the account is invalid or non-compliant.

* * * * *